June 11, 1968     A. D. WHITE     3,388,343
OPTICAL MASER WITH REFLECTING PRISM
Filed Sept. 30, 1963
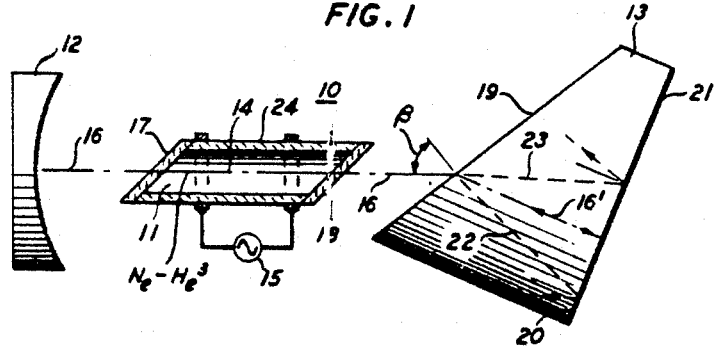
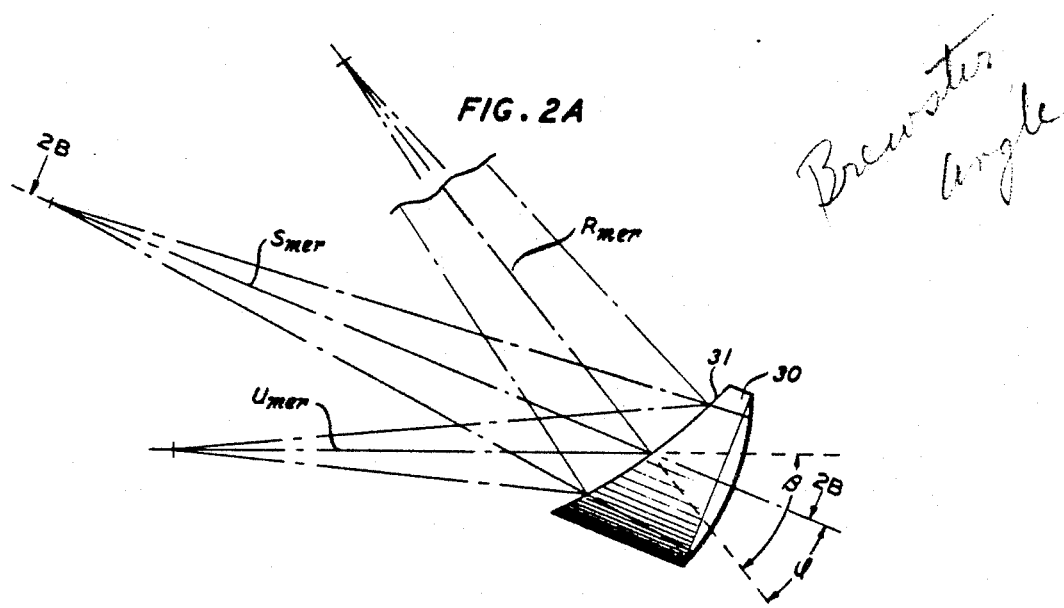
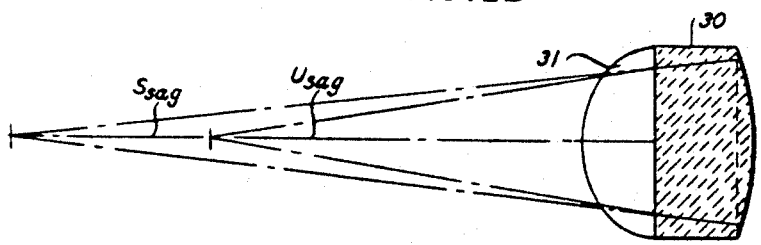
INVENTOR
A. D. WHITE
BY
Kenneth W. Mattern
ATTORNEY

United States Patent Office 3,388,343
Patented June 11, 1968

3,388,343
OPTICAL MASER WITH REFLECTING PRISM
Alan D. White, Berkeley Heights, N.J., assignor to Bell Telephone Laboratories, Incorporated, New York, N.Y., a corporation of New York
Filed Sept. 30, 1963, Ser. No. 312,492
4 Claims. (Cl. 331—94.5)

ABSTRACT OF THE DISCLOSURE

An optical maser in which one cavity extremity comprises a dispersive prism having a first plane energy refracting surface, and a second plane energy reflecting surface upon which the rays of interest are orthogonally incident. An alternative prism embodiment includes a cylindrical refracting surface and a spherical reflecting surface.

---

This invention relates to optical masers, or lasers.

The terms optical maser and laser as used interchangeably herein refer to devices involving electromagnetic radiation in the infrared, visible, and ultraviolet frequency ranges. The object of this invention is to select for operation a comparatively weakly radiating transition from several competing transitions in a laser arrangement.

An additional object is to reduce laser beam astigmatism introduced by spherical reflecting prisms used for such transition selection.

It is now well known that amplification of electromagnetic wave energy can be achieved by stimulated emission of radiation from media in which there is produced a population inversion in a characteristic energy level system. Such media are generally referred to as negative temperature or, at optical frequencies, laser media, and the amplification process is termed laser action or, more simply, lasing.

One way in which to improve the efficiency of the interaction between the wave to be amplified and the negative temperature medium is to cause the wave to resonate in a cavity of appropriate dimensions which contains the medium. At frequencies within the optical range, however, the wavelengths involved are too small to permit cavity dimensions to be of the order of one wavelength, as is typical at the lower microwave frequencies. Accordingly, cavities having dimensions which are many thousands of times larger than the wavelengths of the involved electromagnetic radiation are used.

Numerous cavity structures have been successfully employed in optical maser devices, among which are plane parallel reflective surfaces separated by a convenient gap, and concave spherical reflective surfaces, also spaced apart by an appropriate gap. The reflective surfaces, or mirrors, are positioned with respect to each other and with respect to the negative temperature medium in such a way that light waves are multiply reflected between the cavity extremities, traveling through the active medium on each passage therebetween. During each passage of a wave through the maser medium, it is amplified by interaction with the excited atomic or molecular resonators therein. On the other hand, energy losses are introduced through scattering in homogeneities in the medium, through diffraction at the mirror edges, through reflection at each media interface, and through absorption and transmission at each reflector surface. The practical realization of maser action depends, of course, upon the fact that the associated energy losses can be held to an amount less than the energy gain afforded by the maser medium.

In general, the energy losses introduced by the traversal of media interfaces can be kept to an acceptable minimum by orienting each interface at a particular angle with respect to the plane of incidence of the energy involved. This angle is known in the optics and optical maser arts as the Brewster angle and is defined as the angle whose tangent equals the ratio of the indices of refraction of the medium into which a wave travels over the medium from which it emerges. For energy polarized in the plane of incidence, transmission theoretically occurs without reflection when the Brewster angle condition is met at the frequency of the incident energy. Since the Brewster angle changes very slowly with wavelength, reflection is very small even for surfaces which depart from the Brewster angle by as much as several degrees.

In gas discharge lasers, such as the helium-neon laser, it is frequently possible for population inversion to occur between several lower-state levels and one particularly overpopulated upper-state level. When this condition obtains, laser action can be initiated relatively easily on the strongest transition, but, once oscillation begins, the upper-state is sufficiently depopulated to make laser action on the remaining weaker transitions either extremely difficult or impossible with simple cavity arrangements. It has been priorly suggested that such a condition, which is known in the art as dominance, can be eliminated by introducing a frequency dependent element within the optical maser cavity, thereby making possible selective tuning of the cavity to the weaker transition frequency, simultaneously detuning the cavity for the dominant transition wavelength.

Heretofore, a frequency selective element which has been employed is one or more dispersive prisms inserted within the laser cavity between the negative temperature medium and the external reflectors. Such an arrangement is characterized by considerably increased cavity losses due to the introduction of two additional dielectric interfaces per prism. Although the cavity could be detuned for the dominant transition, such increased losses made oscillation at the weaker transitions extremely difficult.

It has been discovered in accordance with the present invention that the conditions for oscillation at the desired weaker transitions of a laser arrangement can be selectively imposed by utilizing a reflecting dispersive element as at least one cavity extremity.

It has been further discovered that a spherical optical maser cavity including a cavity extremity having a Brewster angle refractive surface and a spherical reflecting surface can selectively oscillate on a relatively weak transition. In this connection it is intended that the term spherical cavity refer to any laser cavity in which at least one extremity has a spherical reflecting surface. Several well known special cases of spherical cavities are hemispheric, in which a spherical reflector is spaced away from a plane reflector a distance equal to the radius of curvature of the spherical surface; and confocal, in which a pair of similar spherical reflectors are separated a distance equal to their equal focal lengths.

It has been further found that the beam astigmatism introduced by a spherical reflecting surface of a laser cavity extremity can be compensated by making the refracting surface of the extremity cylindrical. Such astigmatism, if not corrected, can severely degrade laser oscillation.

Another object of the invention is to improve the helium-neon gas laser. To this end, another feature of the invention is the substitution of the He$^3$ isotope for the He$^4$ isotope in the normal helium gas filling in a helium-neon laser. This results in at least a twenty-five percent increase in available output power for masers operating well above threshold and facilitates operation at a desired weaker transition.

In accordance with the invention, a reflecting prism is used as a laser cavity extremity and combines the function of a dispersive element with that of a reflector in a single optical structure. A plane reflecting prism can be used with a spherical mirror as the opposite cavity extremity to form an optically resonant cavity within which a suitable negative temperature medium is disposed. Alternatively, the reflecting prism can have a spherical reflecting surface, the refracting Brewster angle surface of the prism being configured to have a concave cylindrical curvature. In a preferred embodiment, the negative temperature medium is a mixture of Ne and He $^3$.

The above and other objects and features of the invention, its nature and its various advantages, can be more readily understood from reference to the accompanying drawing and to the detailed description thereof which follows.

In the drawing:

FIG. 1 is a schematic view of an optical maser arrangement employing a plane reflecting prism and a Ne-He $^3$ gas mixture in accordance with the invention; and FIGS. 2A and 2B are different views of a spherical reflecting prism useful in the arrangement of FIG. 1.

Referring now to the drawing in detail, there is illustrated a gaseous optical maser 10 comprising a negative temperature medium 11 disposed within an interferometer cavity consisting of reflecting means 12 and 13. Gaseous negative temperature medium 11 has a typical length of 100 centimeters and comprises a mixture of gases characterized by an appropriate energy level system for optical maser action contained in a glass or other dielectric envelope 24 having a central axis 14.

For optical maser action, the energy level system includes a pair of levels between which a population inversion can be at least intermittently established, the return of this system to equilibrium being accompanied by the emission of electromagnetic wave energy in the optical frequency range. Thus, for example, a mixture of helium and neon gases can be used.

In the past it has been common to use a mixture of neon gas and commercial helium, which is largely the isotope He $^4$, in a five to one helium-neon pressure ratio. Other ratios can, of course, also be used in laser arrangements. I have discovered that the effective population inversion in a helium-neon laser can be increased by a factor of one-fourth or more by substituting the lighter isotope He $^3$ for the normal isotope He $^4$ in the gas filling. Such a substitution results in an increase in the associated electron temperature of the gas mixture and an increase in the rate at which helium metastable atoms are destroyed by collision with neon atoms—thereby raising the latter to the desired upper state—relative to the rate at which helium atoms are destroyed through electron collisions.

In particular, helium which is about 99 percent He $^3$, such as that supplied by Monsanto Research Corporation, can be used. At maximum laser output, the power increase with such a gas mixture has been found to be at least 25 percent. A smaller proportion of He $^3$ results in reduced power output improvement. Relative helium-neon pressure ratios typical of the prior art can be used.

Typically, such gaseous mixtures are characterized by a plurality of levels which simultaneously are depopulated with accompanying energy radiation at a plurality of discrete frequencies. In one typical mode of operation of the device of FIG. 1, excitation from source 15 is applied to the gas mixture by means of electrodes encircling envelope 24, thereby causing an electrical discharge to flow in the medium 11. The energy from the internal discharge excites the helium atoms to an upper energy state from which energy can be transferred to colloding neon atoms, thereby raising the neon atoms to an upper energy state. Additionally, direct collisions between the neon atoms and energic electrons raises some neon atoms to the upper level. These neon atoms can then be stimulated by radiation to emit energy coherently in a continuous stream, the resultant energy beam, typified by ray 16, being reflected back and forth along axis 14 between reflecting means 12 and 13, growing in intensity upon each traversal of the negative temperature medium. Each passage of energy beam 16 between the external reflectors involves a traversal of output windows 17, 18 of envelope 24, which can comprise plane sheets of high quality homogaseous optical grade glass, or fused quartz such as Corning No. 7940 and which are inclined at the Brewster angle to axis 14 and to beam 16. For certain applications, windows 17, 18 can comprise plano-convex or convexo-convex lenses, as described in a commonly-assigned copending application of H. W. Kogelnik and W. W. Rigrod, Ser. No. 163,135, filed Dec. 29, 1961, now United States Patent 3,144,617 which issued Aug. 11, 1964. Windows 17, 18 are sealed to the envelope containing the negative temperature medium 11, advantageously by a procedure involving thermal fusion of their contacting surface portions.

Reflecting means 12 comprises a spherical reflector, which can comprise a dielectric or metallic base having a metallic reflecting surface or a multiple layer dielectric coating. For operation as a hemispherical cavity, the focal length of mirror 12 is equal to the spacing between the reflecting surface of reflectors 12 and 13.

In accordance with one aspect of the present invention, reflecting means 13 comprises a dielectric prism having a beam refracting surface 19 disposed at the Brewster angle with respect to incident energy beam 16 and a beam reflecting surface 20 orthogonally disposed with respect to beam 16', which corresponds to beam 16 after refraction. Prism 13 can comprise fused quartz or optical quality glass, and has a conventional 13, 15 or 17 layer reflecting coating 21 disposed upon reflecting surface 20. As a typical example, coating 21 can comprise alternate layers of magnesium fluoride and zinc sulfide, each approximately one quarter wavelength thick at the desired frequency of operation.

As stated hereinbefore, typical gaseous optical maser media are characterized by a plurality of energy levels. Frequently, maser transitions occur between a common upper level and several lower levels, each transition producing radiation of a different frequency. In general, one of the transitions is dominant with respect to the others and, once emission is stimulated at the dominant frequency the upper states are depopulated sufficiently to render sustained oscillation via the weaker transitions extremely difficult. As is illustarted in FIG. 1, prism 13 is characterized by a frequency dependent dispersive effect which results in an incident collimated beam containing a plurality of frequency components to decollimate, or diverge upon entering the prism. Thus the shorter wavelength beam portions 22 are refracted at a greater angle than desired wavelength portion 16', while longer wavelength beam portions 23 are refracted at a lesser angle than portion 16'. Upon reaching reflecting surface 21, beam portions 22, 23 are reflected thereby away from the axis of the medium and cavity at an angle equal to their respective angles of incidence. Any beam portions which are no longer parallel to the beam axis 16 are, either immediately or after several reflections, lost from the laser cavity. By rotating prism 13 about an axis normal to the plane of the drawing, the laser cavity can be tuned to any one of the radiating transitions with concomitant detuning of adjacent unwanted transition frequencies.

The particular structure of FIG. 1 thus combines the functions of a dispersive tuner and a reflector in a single element. Such an arrangement possesses several important advantages over the multiple element structure of the prior art, among which are a permanent protection of the initial, critical layers of the dielectric reflecting coating, lower cavity losses resulting from the elimination of at least two air to dielectric interfaces, and the ready accessibility of the reflecting surface for external energy extraction, mode selection, and impedance matching purposes. In addition, the beam portion 16' is reflected back upon itself for normal incidence upon layers 21, thus preserving laser action without the inconvenience of lateral beam shifting present in total internal reflection arrangements.

The above description of FIG. 1 has been given with respect to a laser cavity in which a spherical mirror and a plane reflector form the cavity extremities. In many cases, it is desirable that the laser cavity be confocal; i.e., that both reflectors be spherical, with radii of curvature equal to their separation. The desirability of the confocal, or near confocal, condition, arises from the direct proportionality between laser medium gain and its length and the converse proportionality between the laser medium gain and its diameter. It follows that long narrow laser tubes are most efficient. Thus the desired beam is a narrow pencil beam, a condition best obtained in a confocal laser cavity environment. In further accord with this invention, therefore, reflecting surface 20 of prism 13 of FIG. 1 can be made spherical with appropriate radius of curvature without destroying the frequency selective nature of the dispersive-reflective prism. However, such a combination of a prism and a spherical reflecting surface is astigmatic and therefore causes the laser beam to have a different wavefront curvature in each of the two principal planes. Such a laser beam is undesirable for most purposes since the quality or Q factor for low order modes of the laser cavity resonance for such a beam is reduced, thus making oscillation on weak transitions very difficult.

In accordance with a further aspect of the present invention, therefore, the beam astigmatism of a spherical reflecting prism is eliminated by making the refracting surface thereof concave cylindrical. An understanding of this particular aspect of the invention can be more readily gained from reference to FIGS. 2A and 2B of the drawing.

In FIG. 2A, a meridional plane view of an astigmatism compensated spherical dielectric reflecting prism 30 is shown; and in FIG. 2B, a sagittal plane view of prism 30 is shown. By way of definition, the meridional plane is the plane of the drawing in FIG. 1 and the sagittal plane normal to the meridional plane and containing the normal to the spherically curved surface, that is, beam portion 16'. The input ray axis is collinear with $U_{mer}$, the optical radius of curvature of prism 30 in the meridional plane; and $U_{sag}$, the optical radius of curvature of the prism in the sagittal plane. The ray is incident at an angle $\beta$ and is refracted at surface 31 at an angle $\varphi$.

The general expressions for the refraction of a thin astigmatic pencil of rays at a surface with arbitrary curvature in two principal planes, as given by Born and Wolf in "Principles of Optics," Chapter 4 (1959), can be rewritten in the environment of FIGS. 2A and 2B as $$\frac{1}{U_{mer}} - \frac{n}{S_{mer}}\frac{\cos^2 \varphi}{\cos^2 \beta} = \frac{1}{R_{mer}}\left(\frac{1}{\cos \beta} - \frac{n \cos \varphi}{\cos^2 \beta}\right) \quad (3)$$

and $$-\frac{1}{U_{sag}} + \frac{n}{S_{sag}} = \frac{n \cos \varphi - \cos \varphi}{R_{sag}} \quad (4)$$

where $R_{mer}$ and $R_{sag}$ are the geometrical radii of curvature of the refracting surface. It is assumed in this analysis that one of the principal planes of the ray pencil coincides with one of the principal planes fo curvature of the prism.

The criterion for stigmatic imaging is that $U_{mer} = U_{sag} = U$, which implies that a point source located at U will be imaged by the optical system at U. Thus, U becomes the optical center of curvature of the reflecting prism. By properly choosing $R_{sag}$ and $R_{mer}$, the reflecting prism can be made stigmatic for arbitrary choice of $S_{sag}$ and $S_{mer}$. In the specific case of interest, the reflecting surface is made spherical, and therefore $S_{sag} = S_{mer} = S$; and $R_{sag}$ is made infinite. Solving the modified Born and Wolf equations for $R_{mer}$, $$R_{mer} = \frac{\dfrac{1}{\cos \beta} - \dfrac{n \cos \varphi}{\cos^2 \beta}}{\dfrac{n}{S}\left(1 - \dfrac{\cos^2 \varphi}{\cos^2 \beta}\right)} \quad (5)$$

In the present case $\beta$ is the Brewster angle of incidence, and Equation 5 therefore reduces to $$R_{mer} = \frac{S}{n \cos \beta} \quad (6)$$

the condition for stigmatic imaging by prism 30, with an optical radius of curvature $U = S/n$. It is thus evident that the astigmatism of an uncorrected spherical reflecting prism used as one reflector in a confocal laser cavity can be eliminated by making the refracting surface of the prism cylindrical in accordance with Equation 6.

A comparison of the focal images formed by an uncorrected spherical reflecting prism and by one corrected for astigmatism in accordance with the invention has been made.

For the uncorrected prism, $S = 3.9$ meters, $n = 1.458$, and $R_{mer} = R_{sag} = \infty$; while for the corrected prism, $S = 3.9$ meters, $n = 1.458$, $R_{sag} = \infty$, and $R_{mer} = 4.7$ meters. A laser beam, diverging from a point approximately 2.7 meters from the prism surface illuminated the prisms. The meridional focus, at 0.9 meter, and the sagittal focus, at 2.8 meters, for the uncorrected prism showed elongations characteristic of astigmatic optical elements. Conversely, the image formed by the corrected prism was very nearly circular at all points in the image space.

Experimentally, using a laser cavity with one reflecting prism extremity and one spherical mirror extremity, transitions at 6118 A. and 6401 A. have been made to oscillate. In addition, oscillation at many priorly observed transitions at infrared frequencies has been demonstrated.

While the above disclosure of cavity lasers has been particularly described with reference to a combination of one reflecting prism and one spherical mirror, the invention is not intended to be limited in this respect. In many cases, it may be desirable to utilize reflecting prisms at both cavity extremities, oriented with either cumulative or noncumulative dispersive effect.

Reflecting prisms and $He^3$ substitution in accordance with the present invention have been found particularly useful in obtaining oscillations on the weakest $3s_2 \rightarrow 2p$ visible transitions in the helium-neon laser. For example, laser transitions at 6046 A. and 5940 A. have been made to oscillate in a 1.2 meter, 4 millimeter I.D. laser tube with a pair of reflecting prisms in accordance with the invention but not with any other available reflector combinations. The same tube when used with a 15 layer reflecting prism and a 13 layer spherical mirror, rather than a second reflecting prism, has an output power of over 40 milliwatts at the dominant 6328 A.

In all cases, it is understood that the above described arrangements are merely illustrative of a small number of the many specific embodiments which can represent applications of the principles of the present invention. Numerous and varied other arrangements can readily be devised in accordance with these principles by those skilled in the art without departing from the spirit and scope of the invention.

What is claimed is:

1. An optical maser comprising an elongated negative temperature medium,
   means for applying excitation energy to said medium for establishing a population inversion therein,
   an elongated optical interferometer cavity comprising first and second external reflective end members,
   said negative temperature medium being disposed within said cavity in the path of light rays reflected between said end members,
   at least one of said end members comprising a dielectric prism having a first surface at which said rays are refracted and a second surface at which said rays are reflected, said second surface being disposed orthogonally with respect to incident rays of the desired output frequency, and means for abstracting at least a portion of said rays at said desired frequency for utilization.

2. A optical maser in accordance with claim 1 in which said second surface is spherical and said first surface is cylindrical, and in which said rays are incident at said first surface at the Brewster angle $\beta$.

3. An optical maser in accordance with claim 2 in which the radius of curvature R of said first surface is equal to $S/n \cos \beta$, where S is the radius of curvature of said second surface and $n$ is the index of refraction of said prism.

4. In combination, an optical interferometer cavity having an optic axis and having first and second light ray reflective end members forming the extremities thereof, at least one of said reflective end members comprising a plural surface dielectric prism of refractive index $n$ at a given frequency of interest, said prism having a light ray refractive surface disposed at the Brewster angle $\beta$ with respect to incident light rays, means for reflecting rays of said frequency of interest back along said axis, said means comprising a light ray reflective surface of said prism disposed substantially normally to rays at said given frequency after refraction, negative temperature means for interacting with optical frequency wave energy disposed with said cavity in the path of rays traveling between said end members, said reflective surface being spherical with a geometrical radius of curvature S and said refractive surface being cylindrical with a geometrical radius of curvature in the meridional plane $R_{mer}$ equal to $S/n \cos \beta$ and means for abstracting at least a portion of said rays for utilization.

References Cited

OTHER REFERENCES

Harris: Lasers, Electronic Technology (March 1962), pp. 86–94.

Bloom: Observation of New Visible Gas Laser Transitions by Removal of Dominance, Applied Physics Letters, vol. 2, No. 5 (Mar. 1, 1963), pp. 101 and 102.

McFarlane et al.: Single Mode Tuning Dip in the Power Output of an He-Ne Optical Laser, Applied Physics Letters, vol. 2, No. 10 (May 15, 1963), pp. 189 and 190.

JEWELL H. PEDERSEN, *Primary Examiner.*

W. L. SIKES, *Assistant Examiner.*